United States Patent
Schäfer (10) Patent No.: US 7,797,995 B2
(45) Date of Patent: Sep. 21, 2010

(54) DEVICE FOR CHECKING THE TIRE PROFILE DEPTH AND PROFILE TYPE, AND THE SPEED AND GROUND CLEARANCE OF VEHICLES IN MOTION

(76) Inventor: Frank H. Schäfer, Bergstrasse 5, Weilheim (DE) 79809

( * ) Notice: Subject to any disclaimer, the term of this patent is extended or adjusted under 35 U.S.C. 154(b) by 0 days.

(21) Appl. No.: 12/094,419

(22) PCT Filed: Nov. 22, 2006

(86) PCT No.: PCT/EP2006/011186
§ 371 (c)(1), (2), (4) Date: May 21, 2008

(87) PCT Pub. No.: WO2007/059935
PCT Pub. Date: May 31, 2007

(65) Prior Publication Data
US 2008/0256815 A1   Oct. 23, 2008

(30) Foreign Application Priority Data

| | | | |
|---|---|---|---|
| Nov. 22, 2005 | (DE) | ................... | 20 2005 018 223 U |
| Mar. 23, 2006 | (DE) | ................... | 20 2006 004 654 U |
| May 18, 2006 | (DE) | ................... | 20 2006 008 090 U |

(51) Int. Cl.
G01M 17/02   (2006.01)
(52) U.S. Cl. ....................................... 73/146
(58) Field of Classification Search ........................ 73/8, 73/146, 146.5; 340/426.33
See application file for complete search history.

(56) References Cited

U.S. PATENT DOCUMENTS

| | | | |
|---|---|---|---|
| 3,740,710 A | 6/1973 | Weintraub et al. |
| 3,918,816 A | 11/1975 | Foster et al. |

(Continued)

FOREIGN PATENT DOCUMENTS

DE    1809459    6/1970

(Continued)

OTHER PUBLICATIONS

International Preliminary Examination Report dated Sep. 12, 2008.

*Primary Examiner*—Andre J Allen
(74) *Attorney, Agent, or Firm*—Bachman & LaPointe, P.C.

(57) ABSTRACT

A device for detecting a profile depth and/or a profile type of a vehicle tire has a profile-measuring device, a camera system for detecting the vehicle, an evaluating unit, which couples the profile-measuring device and the camera system to one another; and further having at least one of the components: a speed-measuring device for detecting the vehicle speed; a direction of travel-measuring device for detecting the steering situation or movement direction of the vehicle, wherein the evaluating unit is designed to produce a measuring signal for the current acceleration of the vehicle and the control is designed to permit an evaluation only when the vehicle is situated in a preset frame at a relatively uniform speed; and wherein a measuring signal for the movement direction of the vehicle can be produced by the evaluating unit and the measuring signal is provided for control of the evaluation of the profile measurement and the control is designed to permit an evaluation only when the vehicle is situated in a preset frame when traveling in a straight line.

38 Claims, 6 Drawing Sheets

U.S. PATENT DOCUMENTS

| | | | |
|---|---|---|---|
| 4,195,413 A | 4/1980 | Haraguchi et al. | |
| 5,054,918 A | 10/1991 | Downing et al. | |
| 5,757,286 A | 5/1998 | Jonsson et al. | |
| 5,786,533 A * | 7/1998 | Newman | 73/146 |
| 5,801,304 A * | 9/1998 | Cantu et al. | 73/146 |
| 5,809,161 A | 9/1998 | Auty et al. | |
| 5,895,845 A | 4/1999 | Burger | |
| 6,069,966 A * | 5/2000 | Jones et al. | 382/100 |
| 6,075,466 A | 6/2000 | Cohen et al. | |
| 6,266,627 B1 | 7/2001 | Gatsonides | |
| 6,657,711 B1 * | 12/2003 | Kitagawa et al. | 356/155 |
| 6,662,099 B2 | 12/2003 | Knaian et al. | |
| 6,950,789 B2 | 9/2005 | Laird et al. | |
| 7,417,531 B2 * | 8/2008 | Obradovich | 340/426.33 |
| 2002/0092347 A1 * | 7/2002 | Niekerk et al. | 73/146.2 |
| 2004/0057600 A1 * | 3/2004 | Niwa | 382/103 |
| 2009/0046897 A1 * | 2/2009 | Rowsell et al. | 382/107 |

FOREIGN PATENT DOCUMENTS

| | | |
|---|---|---|
| DE | 7640078 U | 3/1977 |
| DE | 3236520 | 4/1984 |
| DE | 4316984 | 8/1994 |
| DE | 29508978 U | 8/1995 |
| DE | 19514219 | 10/1996 |
| DE | 19523917 | 1/1997 |
| DE | 19744076 | 4/1999 |
| EP | 0347090 A2 | 12/1989 |
| EP | 0469948 | 2/1992 |
| WO | 96/10727 A1 | 4/1996 |

* cited by examiner

Apparatus for testing the tyre profile depth and tyre type, the speed and the ground clearance on vehicles during travel

DEVICE FOR CHECKING THE TIRE PROFILE DEPTH AND PROFILE TYPE, AND THE SPEED AND GROUND CLEARANCE OF VEHICLES IN MOTION

BACKGROUND (1) Field of the Invention

The invention relates to a device for detecting the profile depth and/or profile type of a vehicle tire and the ground clearance of vehicles in motion.

(2) Prior Art

To increase traffic safety and to collect fines, in past decades various technical devices have been invented and used in practice. In overview, these are speed measurement, distance measurement, weight monitoring, turning monitoring, traffic-light monitoring, belt monitoring and monitoring of alcohol level in the blood of the driver. Due to the high influence of the set of tyres on the driving physics of a motor vehicle, the set of tyres is measured within the framework of technical inspections and if there is an infringement, a fine is issued. Since 2006, the type of set of tyres is likewise checked, if it is not adapted to the season, the driver is cautioned by means of a fine.

The tyres of HGVs, private cars, motorcycles—simply all driven vehicles—are subject to wear. Below a minimum profile depth fixed by the legislator, a fine must be paid, because driving safety is no longer guaranteed using such a tyre. In Germany, set of tyres obligation is regulated in §36 StVZO. Essentially this provision states the following:

The profile must be at least 1.6 mm over the entire tread. The main profile (about ¾ of the tyre width) must have at least 1.6 mm profile depth and profile grooves must be present everywhere.

Pneumatic tyres must be provided with profile grooves or recesses on the entire periphery and on the whole width of the tread.

The wide profile grooves in the central region of the tread, which occupies about ¾ of the tread, apply as the main profile.

The part of the tyre which comes into contact with the roadway when travelling in a straight line is to be understood as the tread.

Expressed in examples, this means the following according to current administration of justice:

The minimum profile depth must be reached on ¾ of the tyre width. The two remaining ⅛ tyre widths may also have less than 1.6 mm profile depth, but must still have profile grooves.

A tyre has in the centre (¾ of the tyre width) 2.0 mm profile depth and at the outermost edge only 1.0 mm profile depth. This tyre is still according to regulation.

A tyre has on one edge still 6 mm profile depth, in the centre still 3 mm profile depth and on the opposite side is a 5 mm wide strip without any profile grooves. This tyre is to be queried.

The difficulties when applying these provisions do not lie in the implementation, but in the fact that they are not adhered to or regularly checked by the vehicle owners and drivers.

In practice, adherence to these provisions is checked for the motor vehicles, for example by the following measures:

Prescribed regular main investigations

Vehicle monitoring by local regulatory authorities.

However, the monitoring density is so low that—depending on investigation—3% to 7% of all motor vehicles in the Federal Republic of Germany are driven using incorrect tyres.

In practice this means that on a much driven road with, for example 50,000 vehicles per day, between 1,500 and 3,500 vehicles drive which do not have the correct set of tyres.

Checking an HGV having, for example 14 tyres, within the framework of police monitoring for profile depth, is expensive and takes up to 20 minutes.

Manual monitoring of all vehicles is certainly not practicable.

Within the framework of the following laid-open publications, automated measurement of pneumatic tyres and their profiles has been dealt with:

DE 2 900 040 C2
DE 4 316 984 A1
DE 4 101 921 A1
DE-OS 2 206 743
DE-OS 1 809 459
DE 29 508 978 U1
DE 94 11 617 U1
DE 83 04 751 U1
DE-GM 76 40 078
DE 69 113 712 T2
DE 19 744 076 A1
U.S. Pat. No. 3,918,816
WO 96 37 754 A1
WO 96 10 727 A1

Inter alia, camera detection of vehicles has been dealt with in the following publications:

DE 000069720022 T2
DE 000069418039 T2

In particular in DE 19 744 076 A1, the use of automatic profile-measuring apparatuses for determining the profile depths of pneumatic tyres is dealt with.

Publication DE 4 316 984 A1 describes the measurement of tyre profiles using laser light and an optical triangulation process.

A device according to the preamble of claim 1 is described in DE-OS 1 809 459.

Furthermore, DE 69 113 712 T2 discloses a device for determining the wear status of vehicle pneumatic tyre when it passes a predetermined path.

Use of a profile-measuring technique in flowing traffic cannot be realised using the technology described hitherto.

In detail, the following points are thus not to be regarded as solved:

The practical use in flowing traffic.
The protection of the environment, safety standards, danger to people due to the measuring device.
The fact that speeds of 10 km/hour-100 km/hour are conventional and measurements have to be made at these speeds.
The fact that the profile depth cannot be measured in bend situations or steering situations.
Issuing of a fine or the display of warning information for the particular traffic participant.
Identification of the tyre type (summer tyres/winter tyres) in flowing traffic.

The problem underlying the invention is to provide a measuring system which solves the points listed and thus to provide a measuring system which detects the profile depth and the type of set of tyres (summer tyres/winter tyres) of pneumatic tyres in flowing traffic.

SUMMARY OF THE INVENTION

This object is achieved by the invention using a device of the type mentioned in the introduction, in which according to the invention, the following features are provided: a profile-measuring device; a camera system for detecting the vehicle; an evaluating unit, which couples the profile-measuring device and the camera system to one another; a speed-measuring device for detecting vehicle speed; a direction of travel-measuring device for detecting a steering situation or movement direction of the vehicle, wherein the evaluating unit produces a measuring signal for a current acceleration of the vehicle and a control permits an evaluation for the one of several vehicles only when the vehicle is situated in a preset frame at a relatively uniform speed; and a measuring signal for the movement direction of the vehicle being produced by the evaluating unit and the measuring signal and being provided for control of the evaluation of the profile measurement and the control being designed to permit an evaluation for the one of several vehicles only when the vehicle is situated in a preset frame when travelling in a straight line. Advantageous developments can be seen from the sub-claims.

The invention starts from the following consideration:

To measure the profile of a tyre which is attached to a vehicle, which is moving forwards at about 50 km/hour, there are two fundamental possibilities.

1. Record the tyres from the front or from the rear by means of an optical system and ascertain the profile depth from the information thus recovered.

Due to the unfavourable observation angle of 0° to 25°, the recovery of information is very difficult and at the high speeds and the distance between sensor and object to be measured, precise measurement of the profile depth is only possible using a very high light intensity. This is thus not useful in normal road traffic.

2. Record from below the region of the tyre rolling at this moment. It stands relatively still with respect to the camera at the moment of recording.

The rolling tyre is observed through a narrow slot transversely to the movement direction of the vehicles and may be measured at many points, for example with the aid of the known light-section process.

The practical use of such a device already described is—as acknowledged by the invention—however hardly possible. Hence—according to the invention or one of its developments—extensions and improvements are advantageous to achieve reliable measurement of the tyre for a moving vehicle.

Accordingly, the invention relates to a device for detecting the profile depth of vehicle tyres, wherein the device according to the invention consists of:

profile-measuring device camera system for detecting the vehicle, in particular the number plate evaluating electronics which couple the profile-measuring device and the camera system to one another.

One development makes provision in that the device measures at least once, a measuring parameter of the vehicle without contact or with contact, which is a speed or represents a speed inasmuch as it converts the value of the measured parameter by further devices such that the value of the converted parameter and/or the converted value represents a speed, wherein the measured speed or that ascertained from the conversion corresponds to the value of the travelling speed and the detection of the profile depth becomes active only for vehicles which are moving in a preset speed range.

It is advantageous that the evaluating unit uses a measuring signal for speed detection which is produced by a sensor rail and the detection of the profile depth becomes active only for vehicles which are moving in a preset speed range.

The device advantageously additionally comprises at least one of the following components:

speed-measuring device for detecting the vehicle speed direction of travel-measuring device for detecting the steering situation or movement direction of the vehicle A control device to control the measuring sensors with regard to their operating status and/or with regard to their spatial arrangement and/or with regard to their measuring range is preferably present.

The device advantageously has an evaluating device to evaluate the measured values and/or for comparison with stored theoretical values and/or for comparison of the measured values.

In particular, detection becomes active only on a previously selected width.

The width of the tyre and/or the width of the twin set of tyres is preferably measured before profile depth identification.

It is advantageous when the evaluating unit produces a measuring signal for the movement direction of the vehicle, the measuring signal controls evaluation of the profile measurement and evaluation only takes place when the vehicle is situated in a preset frame when travelling in a straight line.

It is also advantageous when the evaluating unit produces a measuring signal for the movement direction of the vehicle via a sensor rail—and/or the camera system, the measuring signal controls evaluation of the profile measurement and evaluation only takes place when the vehicle is situated in a preset frame when travelling in a straight line.

The evaluating unit advantageously produces a measuring signal for the current acceleration of the vehicle. The measuring signal preferably controls evaluation of the profile measurement. Evaluation advantageously only takes place when the vehicle is situated in a preset frame, in particular in non-accelerated/non-delayed travel.

Furthermore, it is advantageous when the evaluating unit produces a measuring signal for current acceleration of the vehicle via a sensor rail. The measuring signal advantageously controls evaluation of the profile measurement. Evaluation only takes place in particular when the vehicle is situated in a preset frame in non-accelerated/non-delayed travel.

The evaluating software is advantageously able to identify dirt.

The evaluating unit preferably has at least one sensor to detect the environmental conditions (for example temperature, rain, atmospheric humidity, dew point).

Following a negatively running profile measurement—and/or during profile measurement still running—automated recording of the controlled vehicle is advantageously produced.

Recording advantageously takes place generally for each vehicle, since it may happen that, for example a long HGV has the poor tyre in the last axle, at this point in time however, a number plate can no longer be detected at the front. Recordings of "good" vehicles may then indeed be discarded.

The sensor rails are advantageously often arranged one behind another in order to be able to measure a greater section of the tyre.

The speed measurement is advantageously used for traffic monitoring, for example to produce a notice of payment due.

In a particularly preferred development, the device and/or elements of the device comprising measuring sensors are transportable and/or coupled to a foundation receiving the device and/or the elements via a fixed or releasable connection.

A display device to display the measured values and/or to display information ascertained in the evaluating device is advantageously present.

The device advantageously produces an acoustic signal when at least one of the measured values deviates to an undesirable extent from previously determined values.

A printing device for printing the results ascertained by the measuring and/or evaluating device is advantageously present.

A conducting device advantageously guides the vehicle to the measuring point(s).

At least one protective device for protecting the sensors and/or certain regions of the device, such as for example electronic components, is advantageously present. This device may equally serve to protect against penetrating moisture.

A sample database with tyre profiles is preferably present.

Identification of the type of set of tyres (for example summer tyres, winter tyres) is advantageously effected.

A notice of payment due is advantageously issued if the set of tyres does not correspond to the season and/or if the profile depth does not correspond to the legal models.

A warning or information (optical and/or acoustic) is effected in particular when the vehicle has a set of tyres which does not correspond to the season and/or when the vehicle has a profile depth which does not correspond to the legal models.

The side of the vehicle, in particular the tyres, are preferably recorded via a camera.

The invention also lists a device for measuring the height profile of a vehicle underbody, which consists of:
height profile-measuring device
camera system for detecting the vehicle, in particular the number plate
evaluating electronics which couple the height profile-measuring device and the camera system to one another.

A control device for control of the measuring sensors with regard to their operating status and/or with regard to their spatial arrangement and/or with regard to their measuring range, is thus preferably present.

In particular, this height profile of the vehicle base is evaluated according to a minimum height.

The device advantageously has an evaluating device to evaluate the measured values and/or for comparison with stored theoretical values and/or for comparison of the measured values.

A warning or information (optical and/or acoustic) is advantageously effected when the vehicle has too low a minimum height.

A printing device for printing the results ascertained by the measuring and/or evaluating device is preferably present.

A notice of payment due or a further document is advantageously issued if the ground clearance does not correspond to the models.

A conducting device advantageously guides the vehicle to the measuring point(s).

The invention also lists a standing area, driving surface or installation frame for recording or for driving over with a vehicle, wherein the standing area or driving surface has at least one device according to the invention or a development, wherein the device is integrated at least partly in the standing area or driving surface or is arranged on it.

Exemplary embodiments of the invention are now described below using the drawing. This should not necessarily represent the exemplary embodiments to scale, rather the drawing is, where useful for illustration, explained in schematised and/or slightly distorted form. With regard to supplements of the teachings which can be identified directly from the drawing, reference is made to the relevant state of the art. It should thus be taken into account that diverse modifications and changes relating to the form and the detail of one embodiment may be carried out without deviating from the general idea of the invention. The features of the invention disclosed in the description, in the drawing and in the claims, may be important both individually and in any combination for the development of the invention. The general idea of the invention is not restricted to the exact form or the detail of the preferred embodiment shown and described below or restricted to an object which would be restricted compared to the object claimed in the claims. For indicated dimension ranges, values lying within the said limits should also be disclosed as limiting values and can be used and can be claimed as required.

BRIEF DESCRIPTION OF THE DRAWINGS

For further understanding of the invention, a preferred embodiment of the invention is now illustrated with reference to the figures of the drawing using the example of a stationary test system to test the tyre profile depth and tyre type on vehicles during travel. Such a test system may also be designed to be mobile in a further embodiment not shown.

The drawing shows in.

DETAILED DESCRIPTION OF PREFERRED EMBODIMENT(S)

Sensor Device for Measuring the Vehicle Speed and Movement Direction

In the run-up to profile measurement, the vehicle should be safely identified in order to switch on the measuring system only in the regions which are covered a few milliseconds later by the tyre or the underbody of the vehicle. Otherwise, a fundamental danger to the environment would occur. Here, essentially the information listed below is necessary, which may be provided reliably, inert alia, by the proposed sensor system.

a. speed of the vehicle
b. width of the tyre(s)
c. position of the tyres above the measuring device
d. movement direction and steering situation of the vehicle
e. length of the vehicle Using this information or some of it, it is possible to start the measurement only for motor vehicles. If a pedestrian, bicycle rider or an animal passes the sensor device, it may thus be reliably detected. The minimum speed should be, for example 5 m/s and the minimum width, for example 75 mm. For use in particular conditions (for example test track) it is of course possible to deviate from the proposals.

Figure 1:
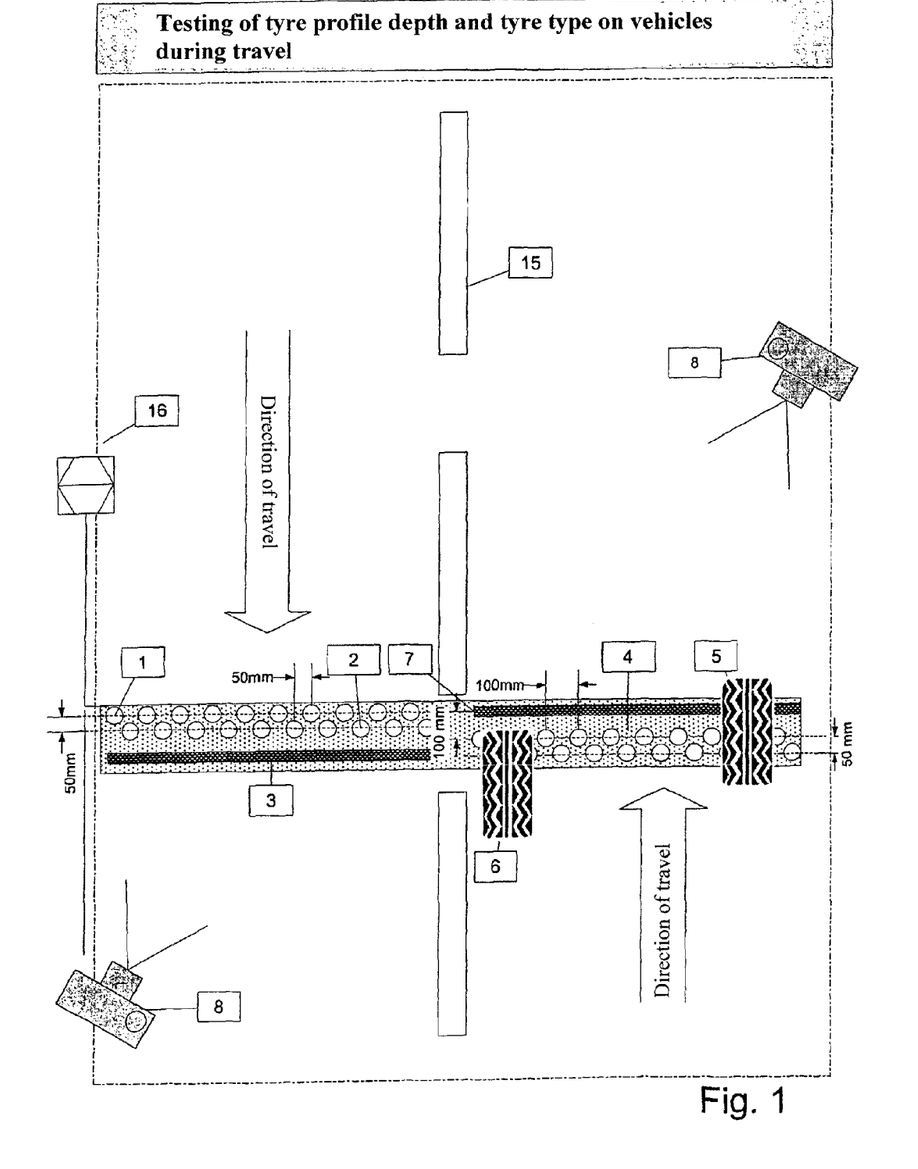
FIG. 1: a first embodiment of a stationary test system in the course of the road in schematic representation in a plan view.
Figure 2:
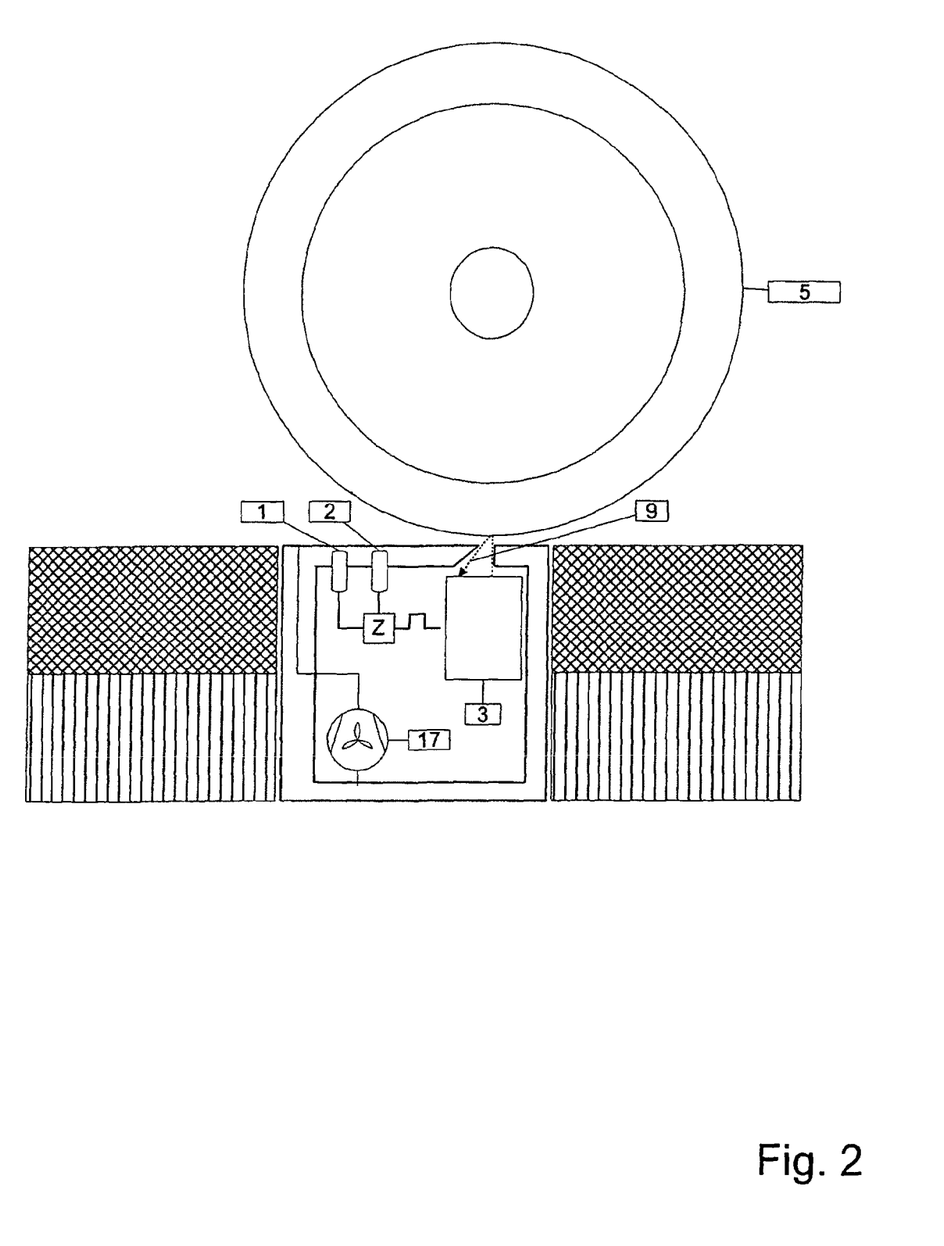
FIG. 2: the test system of FIG. 1 in a side sectional view.

The position of the vehicle and the speed of the vehicle are identified via an arrangement of two rows of sensors (1 and 2) shown in FIG. 1 and FIG. 2, for example capacitive or inductive proximity switches, light scanners, mechanical switches, pressure sensors, induction loops or the like. Optionally of course further information may be recovered from the sensor data. In particular this is the length of the vehicle.

The two sensor rows (1 and 2) provide the information when a vehicle reaches the measuring device, which speed it has and whether a bend situation exists.

In a modified embodiment, in each case a calibration device provided with a defined profile dimension is preferably provided for calibration of the sensor rows (1 and 2) and/or the profile-measuring device 3, 7. By comparison of the actual measuring parameter with the defined profile dimension, a calibration characteristic is produced, by means of which the measurements of sensor rows (1 and 2) and/or of the profile-measuring device 3 can be corrected in operation. For example a defined profile dimension may be arranged on an underside of a cover flap above an opening of a sensor or sensor rows (1 and 2) and/or the profile-measuring device 3.

The following important information of the sensor unit is recorded, evaluated and stored if there is a valid infringement of current rules with regard to the profile depth or the tyre type:

a. The response of each sensor using as precise as possible a time base in the μs range. In 10 μs ($10*10^{-6}$ seconds) a vehicle at 100 km/hour moves about 0.25 mm.

b. The results of the calculations described below.

Figure 4:
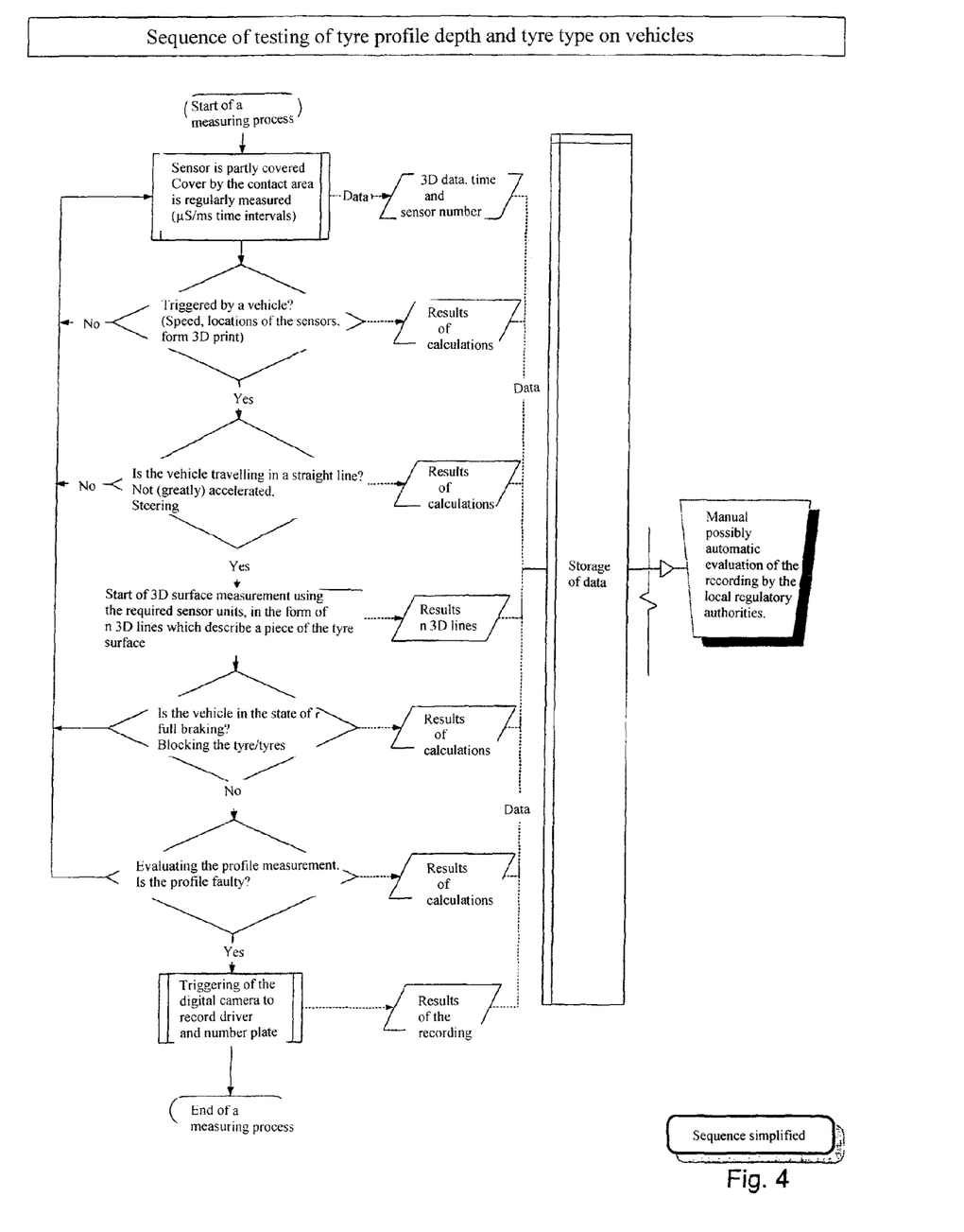
FIG. 4: an example of a process sequence for a test of the tyre profile depth and tyre type on vehicles.

The evaluation is effected by means of rapid electronics, for example according to a sequence shown in FIG. 4. According to conventional algorithms, the following information is recovered from the response times and absolute positions of the sensors:

1. Speed of the vehicle:

Here, the first response of row 1 (1) and the response of the closest sensor or sensors from row 2 (2) is used. This information is used to switch on the laser only for movements in the planned speed range. (For road traffic, for example 5 m/second to 30 m/second are useful (18 km/hour to 108 km/hour)). After the time which is produced from the speed v and the distance (7), the measuring device may be safely switched on. Of course, other information sources are also conceivable, for example Doppler radar or image evaluations.

2. Width of the tyre:

The grid width of the tyre is ascertained from the number of responding sensors next to one another from row 1 and from row 2. The sensors are arranged to be offset. On the whole fewer sensors have to be installed in this manner. Of course the sensors may equally be mounted in other arrangements.

For a distance of the sensors in a row of, for example 100 mm and two offset rows, the measuring accuracy is ±25 mm on each side. If now, as shown in sketch 1 (5), 3 sensors respond, it follows that the tyre width must lie in the grid between 150 mm and 200 mm. The effective tolerances of the sensors must thus be taken into account. These tolerances necessitate a further tolerance range which lies at a few centimetres or millimetres, depending on sensor type. This information is used to switch on the laser only in the region of the tyre. If the tyre width is below a limiting range, for example 100 mm, the laser is not switched on for measurement. In this case, for example a bicycle, foot or animal can be assumed.

3. Number of tyres:

Depending on vehicle type, between two tyres and more than 10 tyres are to be expected. The vehicle type may be ascertained with relatively high safety from the tyre number and the distance between the axles. Here the information of an optional induction loop may also be used.

4. Steering situation of the vehicle:

When the vehicle is in a steering movement, a tyre/tyre pair (5) reaches the sensor rail (1 and 2) before the other tyre/tyre pair (6) of this axle. The points in time of all axles and tyres may be used to calculate a complete movement profile of the vehicle.

The information of the tyre profile measured subsequently may only be usefully evaluated by the upstream sensor rail. When valid data are to be expected, the measuring device may be activated for depth measurement of the tyre profile. Of course the data of an axle may also be subsequently discarded when the movement profile of the vehicle changes during measurement.

Profile Measurement and Use of the Data from Points 1-4

The maximum speed, at which the profile of the pneumatic tyre may be measured, depends of the measuring speed of the sensor technology used. Currently sensors with 16 μs ($16*10^{-6}$ seconds) detection time can be obtained. The measuring accuracy of the currently available technology lies at better than 0.05 mm.

To measure the profile, a sensor admitted into the road surface is used. This observes the rolling wheel via a slot. The profile of the tyre is recorded with the aid of a laser and of the light-section process or a further measuring technique (radar, microwave, ultrasound, etc.) and using suitable algorithms. Of course information about larger surfaces or the whole tyre may also be recovered via several measuring devices or a laser beam or radar beam controlled in driving direction.

In practical use of a profile-measuring device, uniform traffic sequences cannot be assumed.

Therefore the following points are to be regarded as hitherto not solved:

a) That the profile of a pneumatic tyre is deformed during a braking situation (full braking) or a considerable acceleration. Measuring is not possible safely.

b) During bend travel, the profile is deformed, measurement is not possible safely.

c) That dirt in the profile may lead to error measurements.

d) Danger to the environment or people due to the sensor technology used (laser—eye problem).

e) Identification of summer tyres/winter tyres.

Solution to Points a-e:

a) Positive/negative acceleration situation (slipping)

(See above Pos. 1). The sensor device (3) below the tyre, which is situated in relative rest to the measuring device during a uniform rolling movement, records the same cross-section several times. The comparison, which shows measured profiles, whether the wheel is situated in relative rest to the measuring device, or whether there is a slipping situation. In the case of a slipping situation, various images are recorded.

As the second information source, the speed of the particular axle may be used. If the speed of the vehicle changes considerably between the measurement of the front axle and the last axle, the measurement may be discarded. In this case, a deformation of the tyre profile is assumed, that is an error measurement. The evaluation takes place in the evaluating unit (16).

Bend Travel, Steering Movements (See above Pos. 4). This information is used to prevent triggering of the measuring process or to subsequently discard the recovered data. Only when all tyres of a vehicle pass the measuring device at the angle of, for example 88° to 92°, may the measuring process be triggered or evaluated. The movement angle of the vehicle may be calculated from the recovered information according to simple trigonometric and physical laws. The precise movement angle which is permissible may be determined by the user. Evaluation takes place in the evaluating unit (16).

b) Dirt

Figure 3:
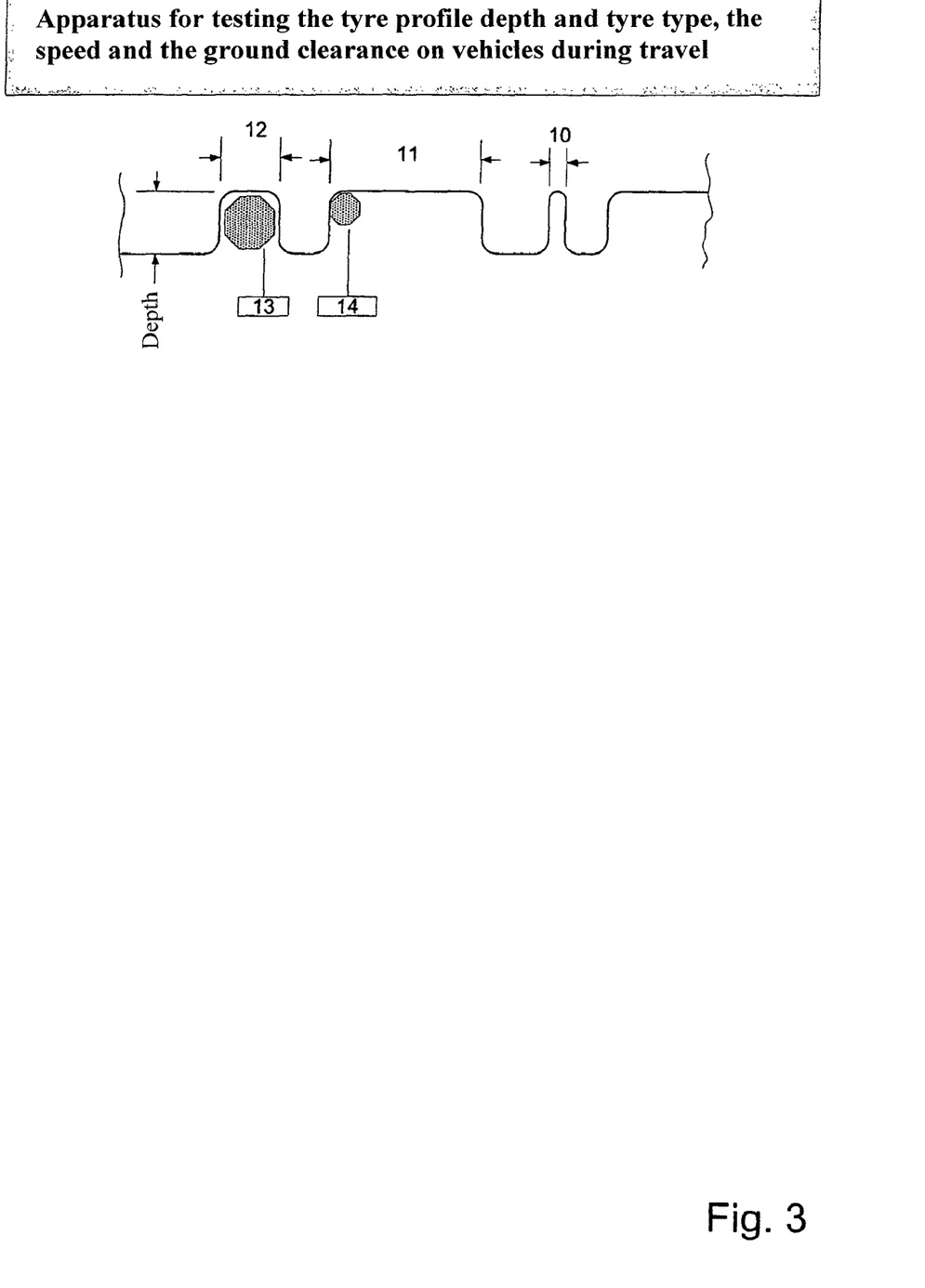
FIG. 3: an example of the course of a profile of a tyre.

The tyre of a vehicle may have dirt in the profile, as shown in FIG. 3. Dirt may optionally be regarded as a faulty profile. This is not permitted within the scope of a clear and reliable measurement.

In order to rule out the effect of dirt, the measured result may be evaluated. Firstly, structures which have a width below a minimum width are not taken into account. The minimum width may be made dependent, for example on the width of the tyre. It is useful, for example to cut out structures having a width of less than 1 mm. For an HGV tyre, this minimum width may be programmed, for example at 2 mm. Using this model, the minimum structures which tend to collect dirt may be minimised. An average depth is calculated over all structures which are relevant according to the above definition. The wear of a tyre is a phenomenon which proceeds almost always uniformly over relatively large surfaces/structures (>1 cm$^3$). Changes in the measured result which do not obey this law may be discarded (12). The structure is on the whole wider than the minimum width, the minimum depth of the structure is however so low compared to the average depth of the entire measurement that it is not taken into account for an evaluation. If a foreign body should be (11) in the profile, the change in depth from minimum depth (this corresponds to the surrounding tread of the tyre) to the maximum depth does not take place in stages but in leaps. This points to the fact that dirt is present. Further rules may thus be defined according to the requirement of the user and may be executed in the evaluating unit (16).

c) Danger to people

If a system for measurement is used which could produce danger to people, the following points are relevant. As the laser system, only a non-visible laser (for example with infrared light) should be used. This is triggered via the sensor rail or a comparable system, for example induction loop in the road surface, radar system on the road side or a camera or light barrier on the road side. Only at the moment when the beam is reflected by the tyre, may the latter be used. As an additional security measure, a laser system is used, which has focussing of a few millimetres or centimetres. This type of focussing means that when the laser is switched on, the beam is without danger at a few centimetres distance.

d) Due to the recording(s) of the profile (3), it is possible to ascertain via a sample database with all conventional profiles, which tyre is present and hence be established whether it is a summer tyre or winter tyre. If no database is available or the profile is not defined, a decision may be made via basic sample identification, for example with the aid of a neuronal network or other known sample-identification techniques whether a set of tyres appropriate to the season is present. In the event of doubt, a human decision based on the measured data is of course equally possible.

By taking into account one or all solutions mentioned above, it is thus possible to use an automated profile measurement in the flowing traffic.

Ground Clearance of the Vehicle:

In addition to detecting the profile depth, a measurement system, which is able to measure the surface profile of a (moving) vehicle, may equally be used in order to detect other data which is relevant to the traffic. Basically, this is a ground profile of the vehicle. Hence, the sensors (1) and (2), image detection or a further system are used to ascertain the width of the vehicle. The height profile of the underbody is recorded over the entire width of the vehicle.

From this ground profile, it is possible to derive, for example which (minimum) ground clearance the vehicle has. This information is recovered from the surface profile of the vehicle. Interfering information, such as for example static drainage strips or spray-protection shields are cut out.

In the StVZO, there are no explicit provisions about the ground clearance of vehicles. Hence, the general models of §30 StVZO in conjunction with the generally recognised rules of the technology and today's standards from vehicle technology and road construction should be applied.

It can be seen that in driving operation which is conventional for traffic when driving over a bump, a pothole, a lowered kerb or for example a test pit, elevating platform or other obstacles, no damage may occur to vehicles and traffic devices (in multi-story car parks, ramps, roadworks etc.).

Expert committees at the Federal Ministry for Traffic see the following statements as information (VdTÜV, Leaflet 751):

Lower-placed vehicles, occupied by a driver, full fuel tank, must be able to drive over an obstacle of 800 mm width and a height of 110 mm centrally without contact.

Under these conditions, it is assumed that no damage—in conventional traffic—may occur. Deviations in justified individual cases may be possible. If ignored however, in such cases both drivers and vehicle owners have the responsibility for the traffic-safe operation of the vehicle. A damaged oil pan for example may lead to direct damage to other traffic participants due to oil escaping onto the roadway.

In other countries of the EU (for example Austria), this is partly strictly regulated. Here, there are minimum ground clearances which are subject to a fine.

Detecting the Vehicle Data

In order to facilitate as automated as possible a sequence of tests, it is necessary to produce the number plate of the vehicle and a photograph of the driver at the point in time of the act.

For this purpose, a conventional camera system (8) is mounted which produces a photograph of the relevant vehicle. The photograph is stored together with the measured profile and the other sensor data. Evaluation of the recovered data for traffic monitoring or for producing a fine is effected according to the conventional technical rules.

Of course information may likewise be recovered from the camera system (8) which is used to solve points a) and c).

Detecting the tyre type may equally be facilitated or assisted via a camera system which is situated transversely to the roadway. This system may produce a recording of the tyre from the side. This recording may facilitate the identification of the tyre or definitively facilitate it via document identification.

Figure 5:
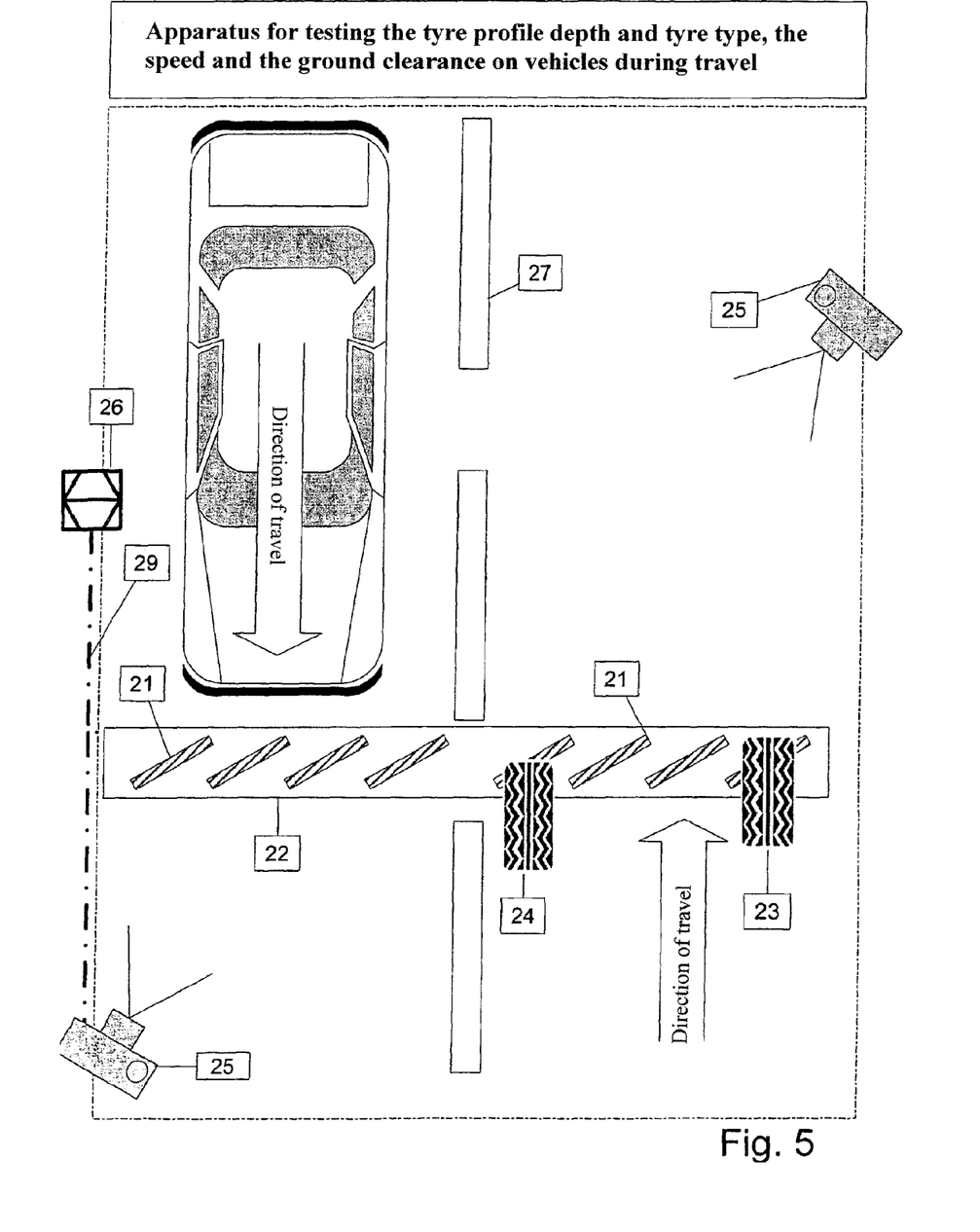
FIG. 5: a second embodiment of a test system in the course of the road in schematic representation in a plan view.

FIG. 5 shows a further embodiment of a profile-measuring device for a roadway for simultaneous measurement of the profile depth of a tyre 23, 24, of a vehicle shown in FIG. 5 but not marked in more detail during movement of the vehicle in the direction of travel and for simultaneous determination of the speed of the vehicle and for determining a direction of travel or direction of movement of the vehicle.

As already within the framework of the first embodiment, in the second embodiment, the inventive concept has also been realised, which permits the practical use of the profile-measuring device in flowing traffic.

In the present case, the profile-measuring device 21 having at least one sensor row for profile-depth measurement is advantageously arranged at an angle to the direction of travel. Hence, the profile-measuring device 21 is attached at an angle in the recording means 22 designed as an installation frame therefor, so that the recording means 22 itself may be admitted into the roadway vertically to the direction of travel of the vehicle. In addition to the profile-measuring device 21 and the recording means 22, the profile-measuring system according to FIG. 5 has a camera system 25 and an evaluating system 26 connected essentially to the profile-measuring device 21 and the camera system 25. Corresponding measuring-signal paths are designated by the reference number 29.

In addition to the profile of a tyre 23, 24, the speed and the direction of travel or steering situation of a vehicle can also be detected by the system shown in FIG. 5 in particularly advantageous manner. The inclined position of the profile-measuring device 21 is thus particularly suitable, since due to the inclined position, a greater effective length is available for speed measurement with a tyre. This is shown by way of example using the tyre 24 in FIG. 6. Due to the angle $\alpha$ of the inclined position, namely an effective length D is available for measuring a speed, a profile and a steering situation of the vehicle compared to a dimension d, which would only be available if the profile-measuring device—for example as in FIG. 1 the profile-measuring device 1, were arranged in the installation frame 4 vertically to the direction of travel of the vehicle.

The steering situation of the vehicle may be detected in the present case simply by comparison of a relative arrangement of a steering tyre 23 relative to a steering tyre 24, as shown in FIG. 5.

Figure 6:
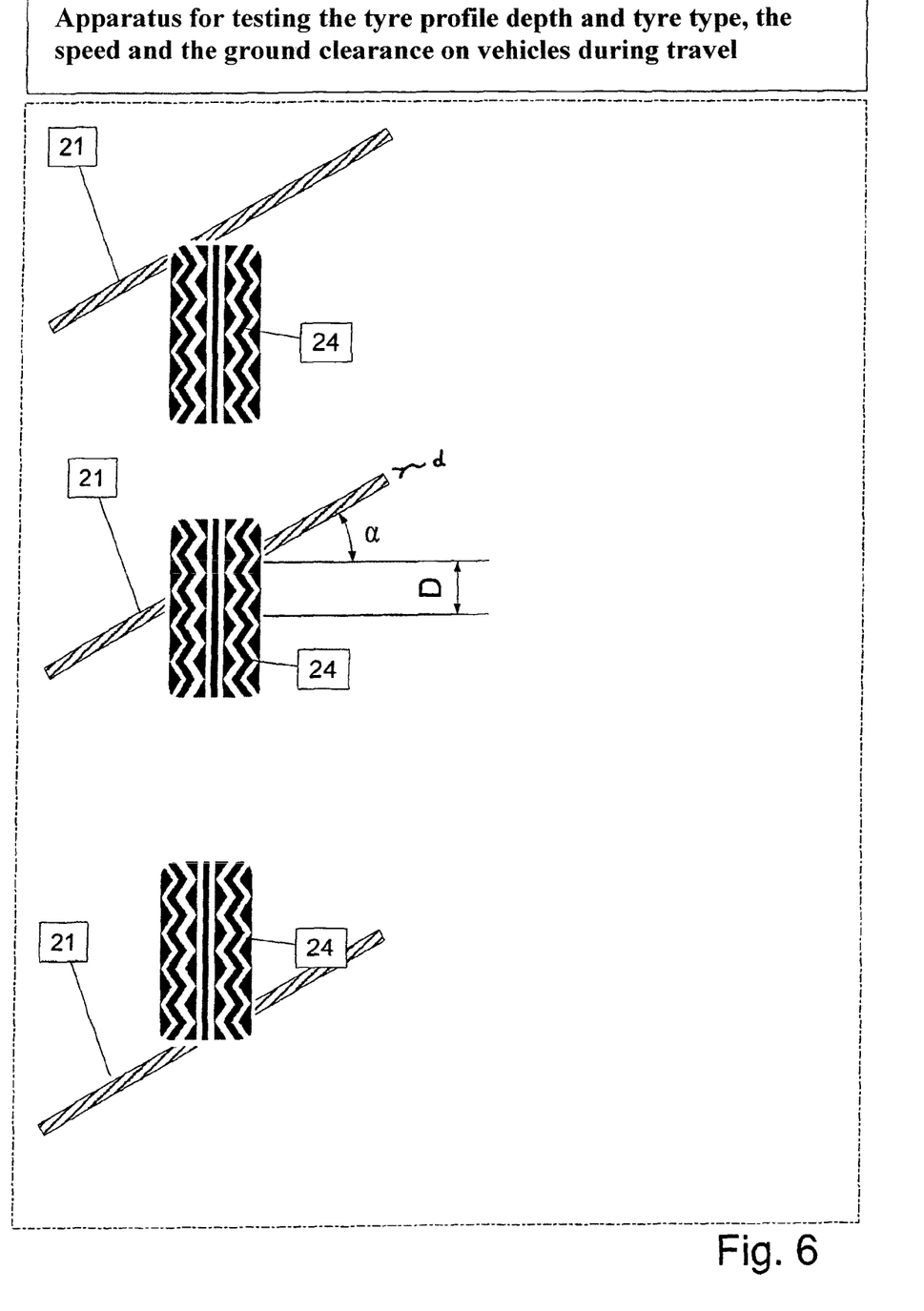
FIG. 6: a detailed representation of FIG. 5.

Furthermore, in the embodiment of a profile-measuring device 21 shown in FIG. 5 and FIG. 6, provision is made; to scan in the profile to be measured with high resolution. Whereas namely concepts of the state of the art are based essentially on a linear or point measurement to detect the profile depth of a tyre, the concept of the present invention makes provision in that a surface scan is carried out over the entire available width d of a profile-measuring device—and hence along the entire length D. It has been shown that a two-dimensional representation of the profile, for example with 30 lines per centimetre and a recording rate of 33 kHz is possible, which corresponds to an illumination time in the range from a few microseconds to record the profile. Due to the two-dimensional representation, not only is the arrangement of several sensor rails superfluous—as for example in FIG. 1—to detect speed and acceleration and the travel situation of the vehicle. Furthermore, it is possible to rule out most sources of error in a profile-depth measurement which result, for example in that a profile is filled up with dirt or with departure indicators of the tyre manufacturer, which would lead to an erroneous result for only point or linear measurement. In a two-dimensional representation, such dirt of smaller or larger type and in particular the departure indicators used by the tyre manufacturer, can be identified freely, so that the true profile depth is nevertheless identified.

Furthermore, the inclined position of the profile-measuring device 21 offers less impact working surface when driven over by a tyre and thus also has a lower development of noise than profile depth-measuring devices aligned vertically to the direction of travel, like those in FIG. 1.

By way of summary, the concept of the invention illustrated by way of example in the first and second embodiment of the invention facilitates for the first time detection of a profile depth of the vehicle in flowing traffic which is acceptable for an expert and can be evaluated legally, and the associated further factors, such as speed, acceleration and travel situation, in particular direction of travel, which prove to be necessary in the evaluation of the measured result in order to be able to assess the relevance of the same.

The invention claimed is:

1. Device for detecting a profile depth and/or a profile type of a profile of a vehicle tire during travel on one vehicle of a plurality of vehicles, in particular in flowing traffic, said device comprising:
   a profile measurement means;
   a camera system for recording the vehicle;
   an evaluation unit which couples the profile measurement means and the camera system to one another;
   a speed measurement means for detecting vehicle speed;
   a direction of travel measurement means for detecting a steering state or direction of motion of the vehicle,
   the evaluation unit being configured to produce a measurement signal for measuring a current acceleration of the vehicle, and a control system configured to allow an evaluation of the one of the plurality of vehicles only if the vehicle is situated in a predetermined frame at a relatively uniform speed; and
   a measurement signal for detecting the direction of motion of the vehicle being produced by the evaluation unit, the measurement signal being provided for controlling the evaluation of the profile measurement, and the control system further being configured to allow the evaluation of the one of the plurality of vehicles only if the vehicle is situated in a predetermined frame and is traveling in a straight line.

2. Device according to claim 1, wherein the camera system is designed to detect a number plate of the vehicle.

3. Device according to claim 1, wherein the device is designed for contact-free speed measurement of the vehicle.

4. Device according to claim 1, wherein the device is configured for speed measurement of the vehicle with contact.

5. Device according to claim 1, wherein the evaluation unit records a measurement signal produced by a sensor rail for speed detection.

6. Device according to claim 3, wherein the device is configured to activate detection of the profile depth only for vehicles which are moving within a predetermined speed range.

7. Device according to claim 1, further comprising a control means for controlling measurement sensors with regard to their operating status and/or with regard to their spatial arrangement and/or their measuring range.

8. Device according to claim 1, further comprising an evaluation means for evaluating measured values and/or for comparing stored theoretical values and/or for comparing the measured values.

9. Device according to claim 1, wherein detection can be activated only for a previously selected width of a vehicle tire.

10. Device according to claim 1, wherein said device is configured to make a width of the vehicle tire and/or a width of a twin set of vehicle tires measurable before the detection of the profile depth.

11. Device according to claim 1, wherein the control system is configured to allow evaluation only if the vehicle is situated in said predetermined frame and is traveling in a non-accelerating, and non-decelerating manner.

12. Device according to claim 1, wherein the measurement signal for measuring acceleration is produced by means of a sensor rail.

13. Device according to claim 1, further comprising a module comprising evaluation software by means of which dirt can be identified.

14. Device according to claim 1, wherein the evaluation unit is configured to make environmental conditions detectable by means of at least one sensor, which environmental conditions are selected from the group consisting of temperature, rain, atmospheric humidity, and dew.

15. Device according to claim 1, wherein an automated recording of a monitored vehicle is produced following negative profile measurement.

16. Device according to claim 1, wherein an automated recording of a monitored vehicle is produced before a profile measurement.

17. Device according to claim 1, further having a number of sensor rails arranged one behind another.

18. Device according to claim 1, further having means for providing a speed measurement for traffic monitoring and for producing a notice of a fine.

19. Device according to claim 1, wherein the device is a transportable device having a releasable connection for coupling to a base which receives the device.

20. Device according to claim 1, further having a display device to display measured values and/or to display information determined by the evaluation unit.

21. Device according to claim 1, further having means for producing an acoustic signal when at least one measured value deviates to an undesirable extent from previously determined values.

22. Device according to claim 1, further having a printing device for printing results determined by the measuring means and/or the evaluation unit.

23. Device according to claim 1 further comprising a guide means for directing the vehicle to at least one measuring point.

24. Device according to claim 1, further having at least one protection device for protecting sensors and/or electronic components.

25. Device according to claim 24, wherein the at least one protection device has a defined standard to calibrate the sensors and/or the profile measurement means.

26. Device according to claim 1, further having a sample database with tire profiles.

27. Device according to claim 1, wherein said device is configured to identify a type of tires, to identify summer tires and/or to identify winter tires.

28. Device according to claim 1, further having means for issuing a notice of a fine if the set of tires does not correspond to a season and/or to the weather.

29. Device according to claim 1, further having means for issuing a warning and/or informing users when the vehicle has a set of tires which does not correspond to the season/weather.

30. Device according to claim 29, wherein the warning issuing, and/or informing means comprises at least one of an optical device and an acoustic device.

31. Device according to claim 1, wherein the camera system includes a camera to record one side of the vehicle and to record a tire.

32. Device according to claim 1, wherein the profile measurement means is a height profile measurement means and/or profile type measurement means.

33. Device according to claim 1, further having a control means for controlling measuring sensors with regard to their operating status and/or with regard to their spatial arrangement and/or with regard to their measuring range.

34. Device according to claim 1, wherein a height profile of a vehicle floor can be evaluated in accordance with a minimum height.

35. Device according to claim 1, wherein the evaluation unit is configured for evaluating measured values and/or for comparing stored theoretical values and/or for comparing the measured values.

36. A system having a means for recording at least one of a ground surface, a driving surface, and a mounting frame and/or being driven over by a vehicle and at least one profile measurement means of the device according to claim 1 being integrated in the recording means or being arranged on the recording means.

37. The system according to claim 36, wherein the recording means is arranged perpendicular to a direction of travel of the vehicle.

38. The system according to claim 36, wherein the recording means is arranged obliquely to a direction of travel of the vehicle.

* * * * *